US012683861B2

(12) United States Patent
Subramanya et al.

(10) Patent No.: US 12,683,861 B2
(45) Date of Patent: Jul. 14, 2026

(54) APPARATUS, METHOD, AND COMPUTER PROGRAM FOR COORDINATING INTERDEPENDENT CLOSED LOOPS

(71) Applicant: Nokia Solutions and Networks Oy, Espoo (FI)

(72) Inventors: Tejas Subramanya, Munich (DE); Janne Ali-Tolppa, Espoo (FI); Stephen Mwanje, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 448 days.

(21) Appl. No.: 18/556,952

(22) PCT Filed: Jun. 9, 2021

(86) PCT No.: PCT/EP2021/065444
§ 371 (c)(1),
(2) Date: Oct. 24, 2023

(87) PCT Pub. No.: WO2022/258169
PCT Pub. Date: Dec. 15, 2022

(65) Prior Publication Data
US 2024/0205084 A1     Jun. 20, 2024

(51) Int. Cl.
| | |
|---|---|
| *H04L 41/0823* | (2022.01) |
| *H04L 12/42* | (2006.01) |
| *H04L 27/00* | (2006.01) |

(52) U.S. Cl.
CPC .......... *H04L 41/0823* (2013.01); *H04L 12/42* (2013.01); *H04L 2027/0053* (2013.01)

(58) Field of Classification Search
None
See application file for complete search history.

(56) References Cited

U.S. PATENT DOCUMENTS

| | | | |
|---|---|---|---|
| 2014/0089509 A1* | 3/2014 | Akolkar | H04L 43/04 709/226 |
| 2018/0225139 A1* | 8/2018 | Hahn | G06F 9/5077 |
| 2020/0106696 A1* | 4/2020 | Michael | H04L 45/24 |

OTHER PUBLICATIONS

"Zero-touch network and Service Management (ZSM); Requirements based on documented scenarios", ETSI GS ZSM 001, V1.1.1, Oct. 2019, pp. 1-89.
Bandh, "Coordination of autonomic function execution in Self-Organizing Networks", Network Architectures and Services Department of Computer Science, dissertation, Apr. 2013, 252 pages.

(Continued)

*Primary Examiner* — Angela Nguyen
(74) *Attorney, Agent, or Firm* — Barta Jones, PLLC

(57) ABSTRACT

The disclosure relates to an apparatus comprising means for: receiving, at a first closed loop function from a second closed loop function, one or more proposed actions to be taken by the second closed loop function with respect to a managed entity, the first and second closed loop functions operating on the managed entity; determining, at the first closed loop function, one or more further actions to be taken, wherein the determining is based on the at least the one or more proposed actions to be taken by the second closed loop function; and causing, by the first closed loop function, the determined one or more further actions to be taken.

20 Claims, 13 Drawing Sheets

700 receiving, at a first closed loop function from a second closed loop function, one or more proposed actions to be taken by the second closed loop function with respect to a managed entity, the first and second closed loop functions operating on the managed entity 702 determining, at the first closed loop function, one or more further actions to be taken, wherein the determining is based on the at least the one or more proposed actions to be taken by the second closed loop function 704 causing, by the first closed loop function, the determined one or more further actions to be taken 706 determining, at a second closed loop function, one or more actions to be taken, the one or more actions being associated with a managed entity 708 sending, from the second closed loop function to a first closed loop function, the determined one or more actions to be taken by the second closed loop function, the first and second closed loop functions operating on a managed entity 710 causing, by the second closed loop function, the determined one or more actions to be taken

(56) References Cited

OTHER PUBLICATIONS

Mwanje et al., "Synchronized Cooperative Learning for Coordinating Cognitive Network Management Functions", IEEE Transactions on Cognitive Communications and Networking, vol. 4, No. 2, Jun. 2018, pp. 244-256.

"Msc-generator", Sourceforge, Retrieved on Oct. 19, 2023, Webpage available at : https://sourceforge.net/projects/msc-generator/.

"Network Assurance with Machine Reasoning and Machine Learning", Cisco, Retrieved on Oct. 18, 2023, Webpage available at : https://blogs.cisco.com/analytics-automation/network-assurance-with-machine-reasoning-and-machine-learning.

"Zero-touch network and Service Management (ZSM); Closed-Loop Automation; Part 2: Solutions for automation of E2E service and network management use cases", ETSI GS ZSM 009-2, V1.1.1, Jun. 2022, pp. 1-30.

International Search Report and Written Opinion received for corresponding Patent Cooperation Treaty Application No. PCT/EP2021/065444, dated Mar. 10, 2022, 14 pages.

"Zero-Touch Network and Service Management (ZSM); Closed-loop automation; Enablers", ETSI GS ZSM 009-1, V0.10.6, Mar. 2021, pp. 1-38.

"ZSM009-1 review for final draft", ZSM#14-e—6.4—ZSM009-1 Closed-loop autom enablers, ZSM(21)000016, Ericsson LM, Jan. 4, 2021, 26 pages.

"ZSM009-3_Composition and Coordination of Interdependent Closed Loops", ZSM#17-e—6.3—ZSM009-3 Closed-loop autom advanced topics, ZSM(21)000364, Nokia, Nov. 10, 2021, 7 pages.

"Discussion Composition and Coordination of Interdependent Closed-Loops", ZSM 9-3, ETSI, Oct. 14, 2021, 14 pages.

"Zero-Touch Network and Service Management (ZSM); Closed-loop automation; Advanced topics", ETSI GR ZSM-009-3, V0.1.0, Oct. 2020, pp. 1-16.

"Zero-touch network and Service Management (ZSM); Landscape", Draft ETSI GR ZSM 004, V1.8.0, May 2021, pp. 1-98.

* cited by examiner

200

214

213

212

211a

215

211b

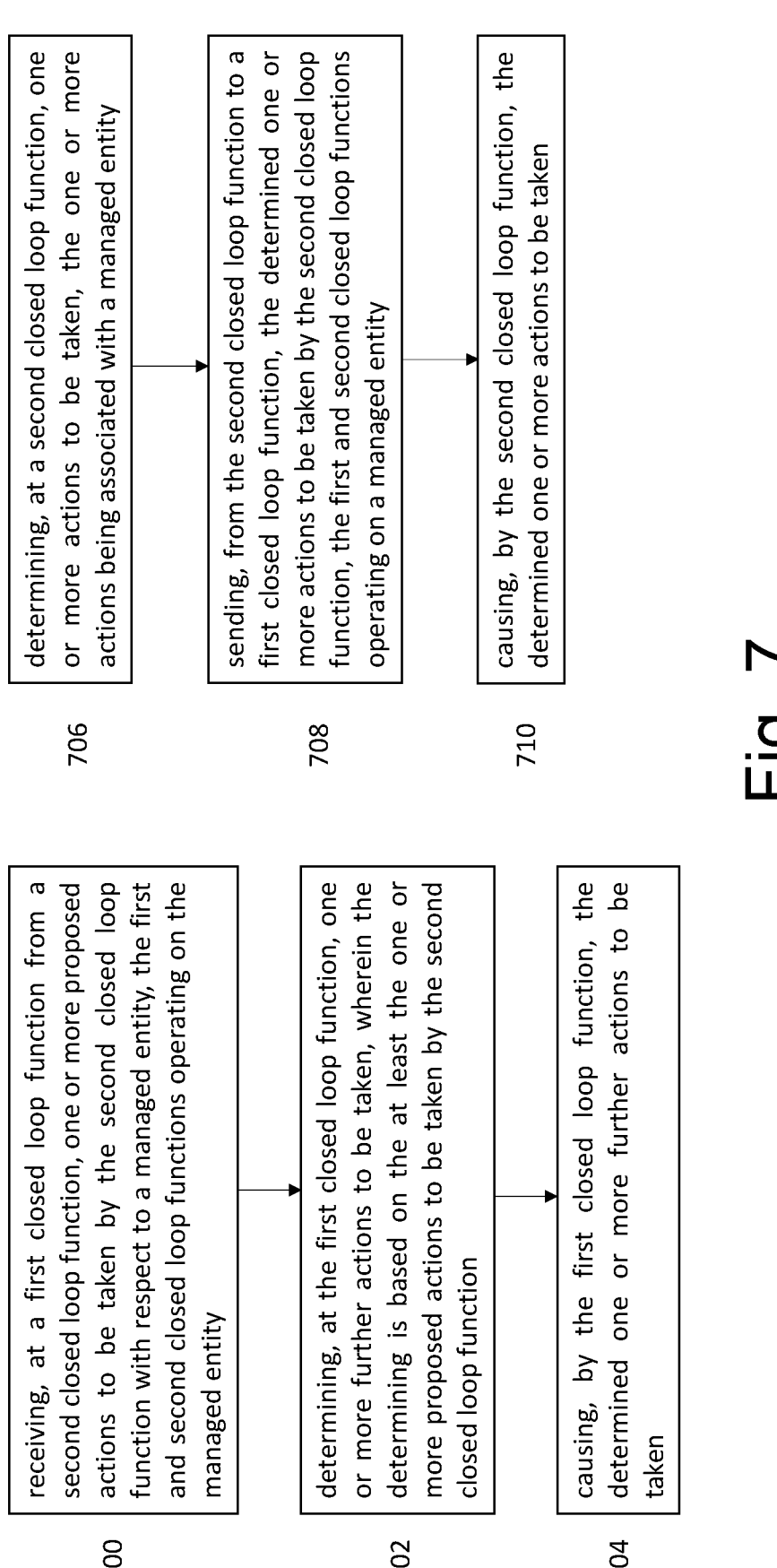

706 — determining, at a second closed loop function, one or more actions to be taken, the one or more actions being associated with a managed entity 708 — sending, from the second closed loop function to a first closed loop function, the determined one or more actions to be taken by the second closed loop function, the first and second closed loop functions operating on a managed entity 710 — causing, by the second closed loop function, the determined one or more actions to be taken 700 — receiving, at a first closed loop function from a second closed loop function, one or more proposed actions to be taken by the second closed loop function with respect to a managed entity, the first and second closed loop functions operating on the managed entity 702 — determining, at the first closed loop function, one or more further actions to be taken, wherein the determining is based on the at least the one or more proposed actions to be taken by the second closed loop function 704 — causing, by the first closed loop function, the determined one or more further actions to be taken

Fig. 7

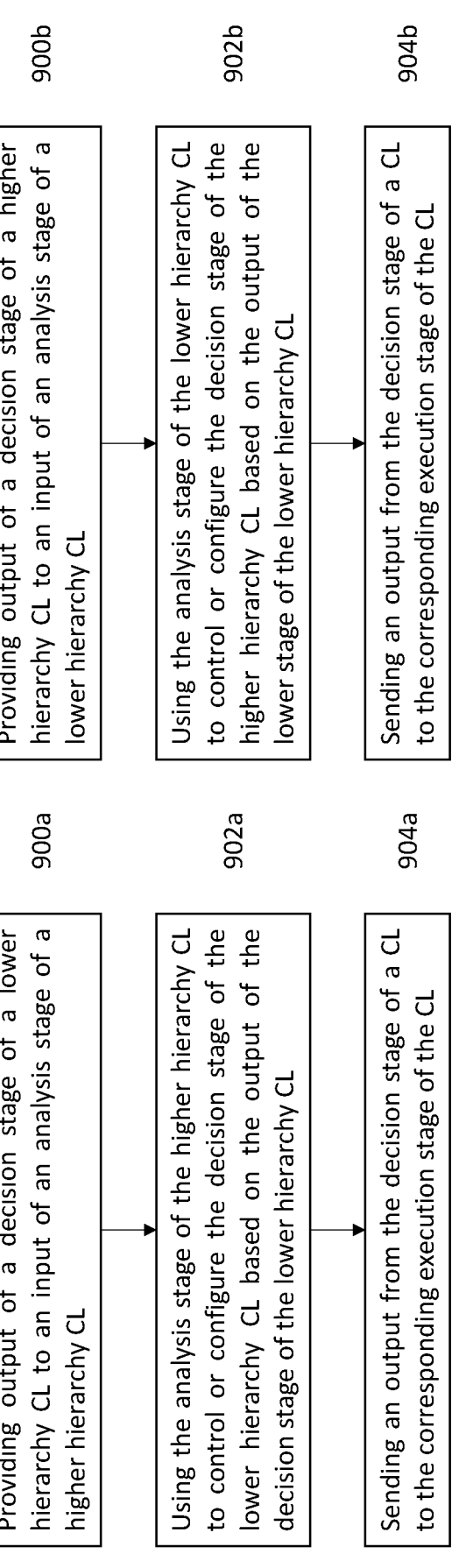

900b Providing output of a decision stage of a higher hierarchy CL to an input of an analysis stage of a lower hierarchy CL 902b Using the analysis stage of the lower hierarchy CL to control or configure the decision stage of the higher hierarchy CL based on the output of the lower stage of the lower hierarchy CL 904b Sending an output from the decision stage of a CL to the corresponding execution stage of the CL

Fig. 9b

900a Providing output of a decision stage of a lower hierarchy CL to an input of an analysis stage of a higher hierarchy CL 902a Using the analysis stage of the higher hierarchy CL to control or configure the decision stage of the lower hierarchy CL based on the output of the decision stage of the lower hierarchy CL 904a Sending an output from the decision stage of a CL to the corresponding execution stage of the CL

Fig. 9a

APPARATUS, METHOD, AND COMPUTER PROGRAM FOR COORDINATING INTERDEPENDENT CLOSED LOOPS

RELATED APPLICATION

This application claims priority to PCT Application No. PCT/EP2021/065444, filed on Jun. 9, 2021, which is incorporated herein by reference in its entirety.

FIELD OF THE DISCLOSURE

The present disclosure relates to an apparatus, a method, and a computer program for determining one or more actions to be taken with respect to a managed entity, and causing the one or more actions to be taken.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known as the long-term evolution (LTE) or the Universal Mobile Telecommunications System (UMTS) radio-access technology. Another example communication system is so called 5G radio or new radio (NR) access technology.

SUMMARY

According to an aspect there is provided an apparatus comprising means for receiving, at a first closed loop function from a second closed loop function, one or more proposed actions to be taken by the second closed loop function with respect to a managed entity, the first and second closed loop functions operating on the managed entity; determining, at the first closed loop function, one or more further actions to be taken, wherein the determining is based on the at least the one or more proposed actions to be taken by the second closed loop function; and causing, by the first closed loop function, the determined one or more further actions to be taken.

The one or more further actions may comprise one or more further actions to be taken by the first closed loop function with respect to the managed entity.

The one or more further actions may comprise: sending, to the second closed loop function and based on the one or more proposed actions, a control message.

The control message may comprise an indication to pause the second closed loop function or an indication to unpause the second closed loop function.

The control message may comprise information for updating an objective of the second closed loop function.

The control message may comprise information for controlling how the second closed loop function provides the one or more proposed actions.

The one or more further actions may comprise: providing, to a third closed loop function, at least the one or more proposed actions, wherein the third closed loop function operates on the managed entity.

The one or more further actions may comprise: receiving, from the third closed loop function, a further control message.

The control message may comprise an indication to pause the first closed loop function or an indication to unpause the first closed loop function.

The further control message may comprise information for updating an objective of the first closed loop function.

The further control message may comprise information for controlling how the first closed loop function provides the one or more proposed actions.

The closed loop functions may be provided in a nested hierarchical structure, wherein the first closed loop function is one of: a higher hierarchy than the second closed loop function; or a lower hierarchy than the second closed loop function.

The first closed loop function may be one of: a higher hierarchy than the third closed loop function; or a lower hierarchy than the third closed loop function.

The second closed loop function may be paused until the first closed loop function causes the determined one or more further actions to be taken.

According to an aspect, there is provided an apparatus comprising means for: determining, at a second closed loop function, one or more actions to be taken, the one or more actions being associated with a managed entity; sending, from the second closed loop function to a first closed loop function, the determined one or more actions to be taken by the second closed loop function, the first and second closed loop functions operating on a managed entity; and causing, by the second closed loop function, the determined one or more actions to be taken.

The means may be for: sending, from the second closed loop function to a third closed loop function, the determined one or more actions, wherein the third closed loop function operates on the managed entity.

The means may be for: receiving, at the second closed loop function and based on the determined one or more actions, a control message.

The control message may be received from one of the first closed loop function or a third closed loop function, wherein the third closed loop function operates on the managed entity.

The control message may comprise an indication to pause the second closed loop function or an indication to unpause the second closed loop function.

The control message may comprise information for updating an objective of the second closed loop function.

The control message may comprise information for controlling how the second closed loop function provides the determined one or more actions.

The second closed loop function may be paused until the first closed loop function causes one or more further actions to be taken.

According to an aspect there is provided an apparatus comprising at least one processor and at least one memory including computer code for one or more programs, the at least one memory and the computer code configured, with the at least one processor, to cause the apparatus at least to: receive, at a first closed loop function from a second closed loop function, one or more proposed actions to be taken by the second closed loop function with respect to a managed entity, the first and second closed loop functions operating on the managed entity; determine, at the first closed loop function, one or more further actions to be taken, wherein the determining is based on the at least the one or more proposed actions to be taken by the second closed loop function; and cause, by the first closed loop function, the determined one or more further actions to be taken.

The one or more further actions may comprise one or more further actions to be taken by the first closed loop function with respect to the managed entity.

The one or more further actions may comprise: sending, to the second closed loop function and based on the one or more proposed actions, a control message.

The control message may comprise an indication to pause the second closed loop function or an indication to unpause the second closed loop function.

The control message may comprise information for updating an objective of the second closed loop function.

The control message may comprise information for controlling how the second closed loop function provides the one or more proposed actions.

The one or more further actions may comprise: providing, to a third closed loop function, at least the one or more proposed actions, wherein the third closed loop function operates on the managed entity.

The one or more further actions may comprise: receiving, from the third closed loop function, a further control message.

The control message may comprise an indication to pause the first closed loop function or an indication to unpause the first closed loop function.

The further control message may comprise information for updating an objective of the first closed loop function.

The further control message may comprise information for controlling how the first closed loop function provides the one or more proposed actions.

The closed loop functions may be provided in a nested hierarchical structure, wherein the first closed loop function is one of: a higher hierarchy than the second closed loop function; or a lower hierarchy than the second closed loop function.

The first closed loop function may be one of: a higher hierarchy than the third closed loop function; or a lower hierarchy than the third closed loop function.

The second closed loop function may be paused until the first closed loop function causes the determined one or more further actions to be taken.

According to an aspect there is provided an apparatus comprising at least one processor and at least one memory including computer code for one or more programs, the at least one memory and the computer code configured, with the at least one processor, to cause the apparatus at least to: determine, at a second closed loop function, one or more actions to be taken, the one or more actions being associated with a managed entity; send, from the second closed loop function to a first closed loop function, the determined one or more actions to be taken by the second closed loop function, the first and second closed loop functions operating on a managed entity; and cause, by the second closed loop function, the determined one or more actions to be taken.

The at least one memory and the computer code may be configured, with the at least one processor, to cause the apparatus to: send, from the second closed loop function to a third closed loop function, the determined one or more actions, wherein the third closed loop function operates on the managed entity.

The at least one memory and the computer code may be configured, with the at least one processor, to cause the apparatus to: receive, at the second closed loop function and based on the determined one or more actions, a control message.

The control message may be received from one of the first closed loop function or a third closed loop function, wherein the third closed loop function operates on the managed entity.

The control message may comprise an indication to pause the second closed loop function or an indication to unpause the second closed loop function.

The control message may comprise information for updating an objective of the second closed loop function.

The control message may comprise information for controlling how the second closed loop function provides the determined one or more actions.

The second closed loop function may be paused until the first closed loop function causes one or more further actions to be taken.

According to an aspect there is provided an apparatus comprising circuitry configured to: receive, at a first closed loop function from a second closed loop function, one or more proposed actions to be taken by the second closed loop function with respect to a managed entity, the first and second closed loop functions operating on the managed entity; determine, at the first closed loop function, one or more further actions to be taken, wherein the determining is based on the at least the one or more proposed actions to be taken by the second closed loop function; and cause, by the first closed loop function, the determined one or more further actions to be taken.

The one or more further actions may comprise one or more further actions to be taken by the first closed loop function with respect to the managed entity.

The one or more further actions may comprise: sending, to the second closed loop function and based on the one or more proposed actions, a control message.

The control message may comprise an indication to pause the second closed loop function or an indication to unpause the second closed loop function.

The control message may comprise information for updating an objective of the second closed loop function.

The control message may comprise information for controlling how the second closed loop function provides the one or more proposed actions.

The one or more further actions may comprise: providing, to a third closed loop function, at least the one or more proposed actions, wherein the third closed loop function operates on the managed entity.

The one or more further actions may comprise: receiving, from the third closed loop function, a further control message.

The control message may comprise an indication to pause the first closed loop function or an indication to unpause the first closed loop function.

The further control message may comprise information for updating an objective of the first closed loop function.

The further control message may comprise information for controlling how the first closed loop function provides the one or more proposed actions.

The closed loop functions may be provided in a nested hierarchical structure, wherein the first closed loop function is one of: a higher hierarchy than the second closed loop function; or a lower hierarchy than the second closed loop function.

The first closed loop function may be one of: a higher hierarchy than the third closed loop function; or a lower hierarchy than the third closed loop function.

The second closed loop function may be paused until the first closed loop function causes the determined one or more further actions to be taken.

According to an aspect there is provided an apparatus comprising circuitry configured to: determine, at a second closed loop function, one or more actions to be taken, the one or more actions being associated with a managed entity; send, from the second closed loop function to a first closed loop function, the determined one or more actions to be taken by the second closed loop function, the first and second closed loop functions operating on a managed entity; and cause, by the second closed loop function, the determined one or more actions to be taken.

The circuitry may be configured to: send, from the second closed loop function to a third closed loop function, the determined one or more actions, wherein the third closed loop function operates on the managed entity.

The circuitry may be configured to: receive, at the second closed loop function and based on the determined one or more actions, a control message.

The control message may be received from one of the first closed loop function or a third closed loop function, wherein the third closed loop function operates on the managed entity.

The control message may comprise an indication to pause the second closed loop function or an indication to unpause the second closed loop function.

The control message may comprise information for updating an objective of the second closed loop function.

The control message may comprise information for controlling how the second closed loop function provides the determined one or more actions.

The second closed loop function may be paused until the first closed loop function causes one or more further actions to be taken.

According to an aspect there is provided a method comprising: receiving, at a first closed loop function from a second closed loop function, one or more proposed actions to be taken by the second closed loop function with respect to a managed entity, the first and second closed loop functions operating on the managed entity; determining, at the first closed loop function, one or more further actions to be taken, wherein the determining is based on the at least the one or more proposed actions to be taken by the second closed loop function; and causing, by the first closed loop function, the determined one or more further actions to be taken.

The one or more further actions may comprise one or more further actions to be taken by the first closed loop function with respect to the managed entity.

The one or more further actions may comprise: sending, to the second closed loop function and based on the one or more proposed actions, a control message.

The control message may comprise an indication to pause the second closed loop function or an indication to unpause the second closed loop function.

The control message may comprise information for updating an objective of the second closed loop function.

The control message may comprise information for controlling how the second closed loop function provides the one or more proposed actions.

The one or more further actions may comprise: providing, to a third closed loop function, at least the one or more proposed actions, wherein the third closed loop function operates on the managed entity.

The one or more further actions may comprise: receiving, from the third closed loop function, a further control message.

The control message may comprise an indication to pause the first closed loop function or an indication to unpause the first closed loop function.

The further control message may comprise information for updating an objective of the first closed loop function.

The further control message may comprise information for controlling how the first closed loop function provides the one or more proposed actions.

The closed loop functions may be provided in a nested hierarchical structure, wherein the first closed loop function is one of: a higher hierarchy than the second closed loop function; or a lower hierarchy than the second closed loop function.

The first closed loop function may be one of: a higher hierarchy than the third closed loop function; or a lower hierarchy than the third closed loop function.

The second closed loop function may be paused until the first closed loop function causes the determined one or more further actions to be taken.

According to an aspect, there is provided a method comprising: determining, at a second closed loop function, one or more actions to be taken, the one or more actions being associated with a managed entity; sending, from the second closed loop function to a first closed loop function, the determined one or more actions to be taken by the second closed loop function, the first and second closed loop functions operating on a managed entity; and causing, by the second closed loop function, the determined one or more actions to be taken.

The method may comprise: sending, from the second closed loop function to a third closed loop function, the determined one or more actions, wherein the third closed loop function operates on the managed entity.

The method may comprise: receiving, at the second closed loop function and based on the determined one or more actions, a control message.

The control message may be received from one of the first closed loop function or a third closed loop function, wherein the third closed loop function operates on the managed entity.

The control message may comprise an indication to pause the second closed loop function or an indication to unpause the second closed loop function.

The control message may comprise information for updating an objective of the second closed loop function.

The control message may comprise information for controlling how the second closed loop function provides the determined one or more actions.

The second closed loop function may be paused until the first closed loop function causes one or more further actions to be taken.

According to an aspect there is provided a computer program comprising computer executable code which when run on at least one processor is configured to: receive, at a first closed loop function from a second closed loop function, one or more proposed actions to be taken by the second closed loop function with respect to a managed entity, the first and second closed loop functions operating on the managed entity; determine, at the first closed loop function, one or more further actions to be taken, wherein the determining is based on the at least the one or more proposed actions to be taken by the second closed loop function; and cause, by the first closed loop function, the determined one or more further actions to be taken.

The one or more further actions may comprise one or more further actions to be taken by the first closed loop function with respect to the managed entity.

The one or more further actions may comprise: sending, to the second closed loop function and based on the one or more proposed actions, a control message.

The control message may comprise an indication to pause the second closed loop function or an indication to unpause the second closed loop function.

The control message may comprise information for updating an objective of the second closed loop function.

The control message may comprise information for controlling how the second closed loop function provides the one or more proposed actions.

The one or more further actions may comprise: providing, to a third closed loop function, at least the one or more proposed actions, wherein the third closed loop function operates on the managed entity.

The one or more further actions may comprise: receiving, from the third closed loop function, a further control message.

The control message may comprise an indication to pause the first closed loop function or an indication to unpause the first closed loop function.

The further control message may comprise information for updating an objective of the first closed loop function.

The further control message may comprise information for controlling how the first closed loop function provides the one or more proposed actions.

The closed loop functions may be provided in a nested hierarchical structure, wherein the first closed loop function is one of: a higher hierarchy than the second closed loop function; or a lower hierarchy than the second closed loop function.

The first closed loop function may be one of: a higher hierarchy than the third closed loop function; or a lower hierarchy than the third closed loop function.

The second closed loop function may be paused until the first closed loop function causes the determined one or more further actions to be taken.

According to an aspect there is provided a computer program comprising computer executable code which when run on at least one processor is configured to: determine, at a second closed loop function, one or more actions to be taken, the one or more actions being associated with a managed entity; send, from the second closed loop function to a first closed loop function, the determined one or more actions to be taken by the second closed loop function, the first and second closed loop functions operating on a managed entity; and cause, by the second closed loop function, the determined one or more actions to be taken.

The computer program comprising computer executable code may be configured to: send, from the second closed loop function to a third closed loop function, the determined one or more actions, wherein the third closed loop function operates on the managed entity.

The computer program comprising computer executable code may be configured to: receive, at the second closed loop function and based on the determined one or more actions, a control message.

The control message may be received from one of the first closed loop function or a third closed loop function, wherein the third closed loop function operates on the managed entity.

The control message may comprise an indication to pause the second closed loop function or an indication to unpause the second closed loop function.

The control message may comprise information for updating an objective of the second closed loop function.

The control message may comprise information for controlling how the second closed loop function provides the determined one or more actions.

The second closed loop function may be paused until the first closed loop function causes one or more further actions to be taken.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Embodiments will now be described, by way of example only, with reference to the accompanying Figures in which:

FIG. 7 shows a method according to some examples;

FIGS. 9a and 9b show a method according to some examples;

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
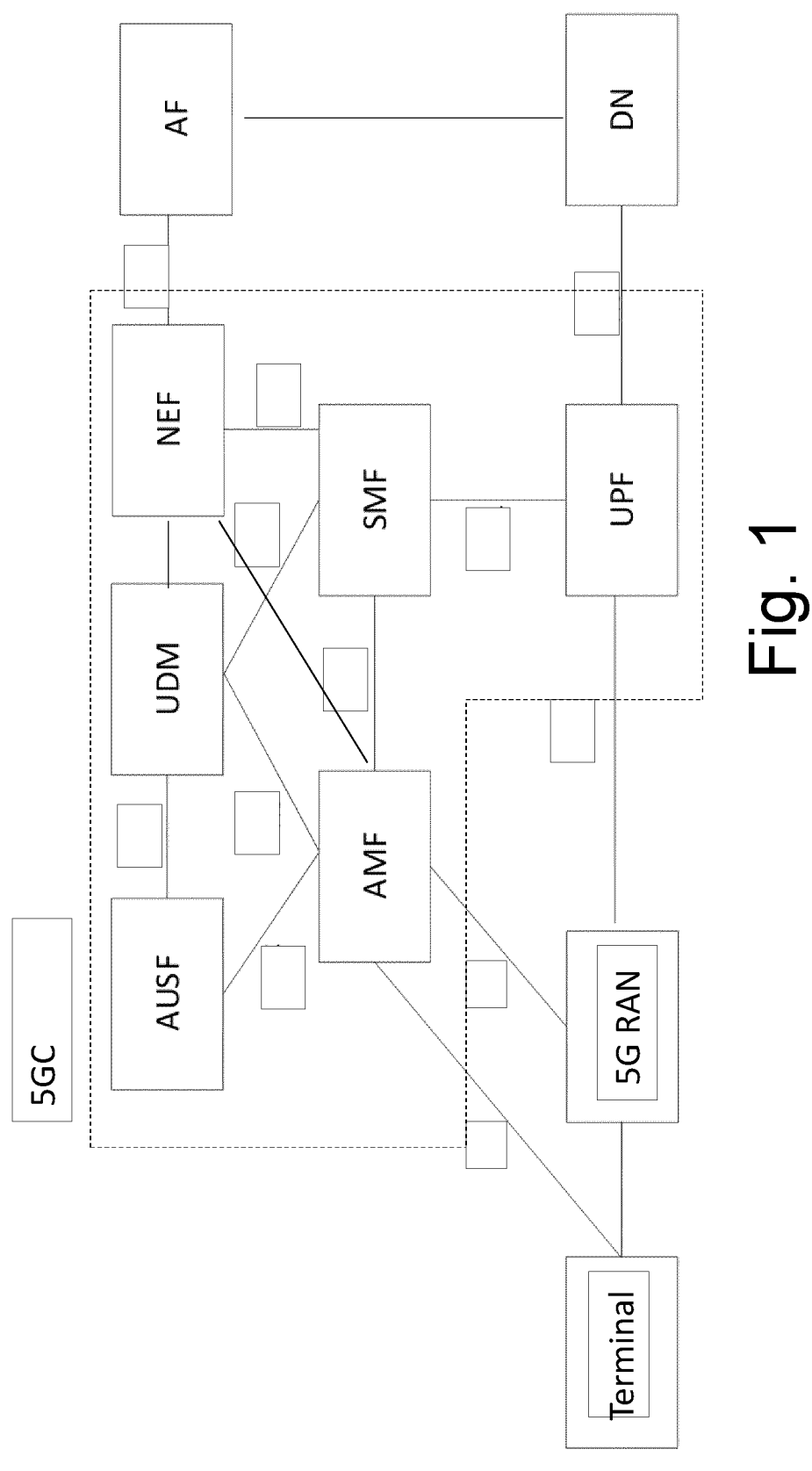
FIG. 1 shows a schematic representation of a 5G system.

FIG. 1 shows a schematic representation of a 5G system (5GS). The 5GS may comprises a terminal, a (radio) access network ((R)AN), a 5G core network (5GC), one or more application functions (AF) and one or more data networks (DN).

The 5G (R)AN may comprise one or more gNodeB (gNB) distributed unit functions connected to one or more gNodeB (gNB) centralized unit functions.

The 5GC may comprise an access management function (AMF), a session management function (SMF), an authentication server function (AUSF), a user data management (UDM), a user plane function (UPF) and/or a network exposure function (NEF). Although not illustrated the 5GC may comprise other network functions (NF), such as a network address and/or port translation function (NAPTF), a network function repository function (NRF), a binding support function (BSF) or a data collection coordination function (DCCF).

Figure 2:
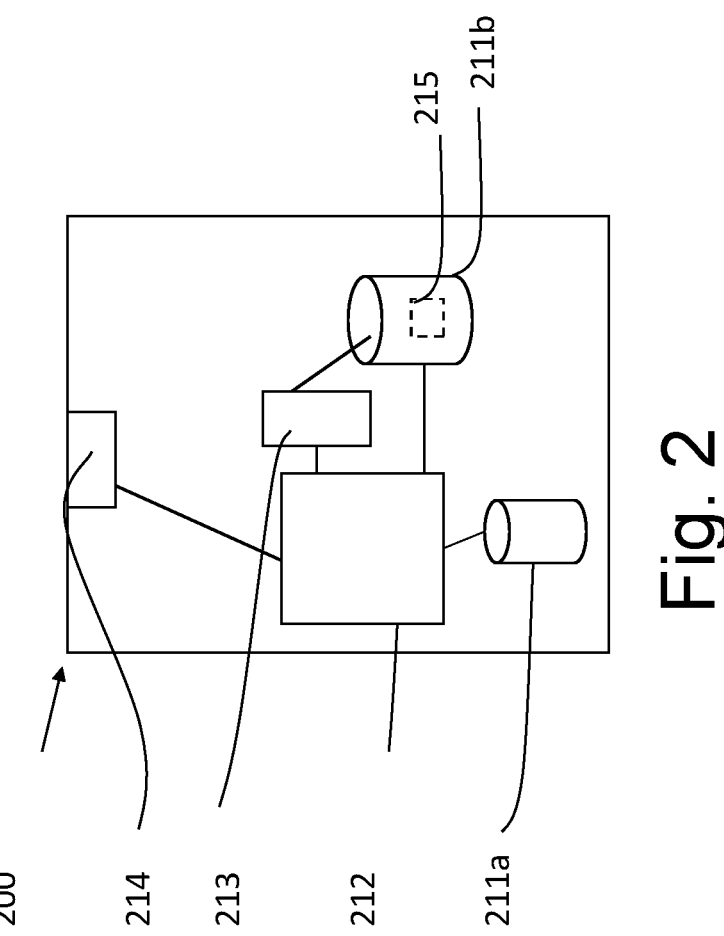
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more procedures to perform one or more of the present aspects. The software code 215 may be stored in the ROM 211b. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

Figure 3:
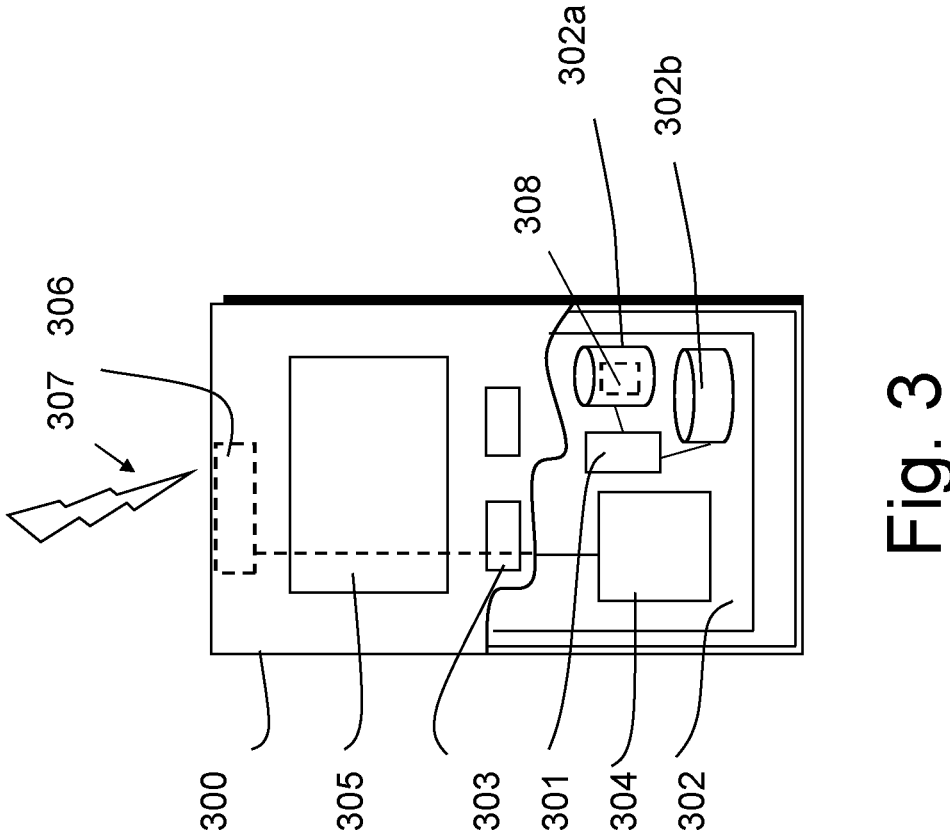
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302a and the ROM 211b. The at least one processor 301 may be configured to execute an appropriate software code 308. The software code 308 may for example allow to perform one or more of the present aspects. The software code 308 may be stored in the ROM 302b.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

In a mobile network different types of data may be collected for various analytics use cases. Data types may include performance monitoring (PM) data, alarms, failure counters or other. Analytics use cases may include closed loop automation cases (e.g. self-organised network (SON) like algorithms), supervised machine learning (ML) based methods (prediction, classification) or unsupervised open loop methods (e.g. anomaly detection, pattern detection).

Closed loop automation (CLA) is a control mechanism that continuously monitors, measures, and assesses real-time network traffic and manages one or more managed entities to achieve a specific goal. A managed entity may for example be a VNF, an entity of a Core Network, or a Network Function. The set of stages that compose a Closed Loop (CL) may include at least one Collection (C) stage and one Execution (E) stage. The collection stage is responsible for monitoring, collecting and pre-processing data from one or several managed entities. The execution stage may be responsible for causing the one or more managed entities to execute one or more actions.

Besides these two stages, the CL can also include Analysis (A) stage and Decision (D) stage. The analysis stage may be responsible for deriving insights from data collected in the Collection stage and historical data. The decision stage may be responsible for deriving workflows from insights provided by the Analysis stage. stages.

Additionally, CLA may also include a Knowledge (K) component. The knowledge component may be a means for storing and retrieving data (e.g., configurational, operational, historical) between the CL stages and/or different CLs.

Figure 4:
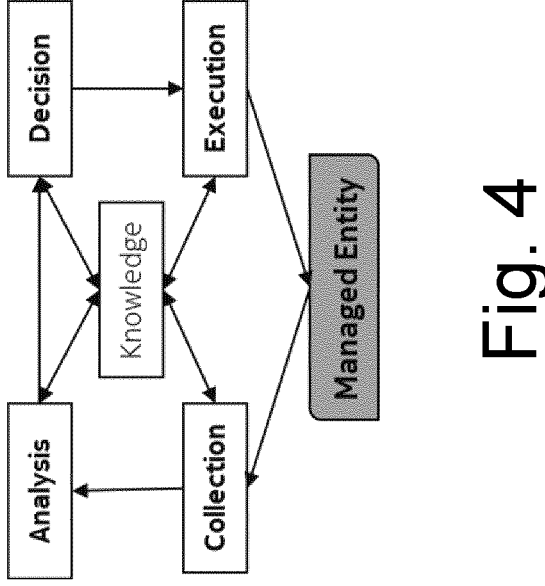
FIG. 4 shows a closed loop function according to some examples.

A CL, once instantiated, may have at least one specified CL goal and at least one target managed entity. A functional view of a CL composed of all four stages (together with the Knowledge component) and acting on a managed entity is shown in FIG. 4.

An example CL model/class as fined in ETSI ZSM 009-1 Technical Specification on 'Closed Loop Automation Enablers" includes the following attributes:

TABLE 1

| Attribute Name | Description |
| --- | --- |
| closedLoopInstanceUniqueId | It indicates the identifier of the CL instance. |
| closedLoopGoal | It indicates goals of the CL. |
| closedLoopPriority | It indicates a priority of the CL. It is set to avoid conflicting actions to the same managed entity. |
| manageableEntityList | It indicates the types/categories of entities that can be managed by the CL. Entities are not instantiated entities, but categories/types/classes or range of products/elements. |
| targetEntityList | It indicates the entities that the CL instance will have to manage after being successfully deployed/instantiated. |
| closedLoopLifeCyclePhases | It indicates the list of supported lifecycle phases of this CL type. Allowed values in the list are Preparation, Commissioning, Operation, and Decommissioning. |
| currentClosedLoopLifeCyclePhase | It indicates which CL life cycle phase the CL is in. |
| closedLoopTypeDescription | It indicates a description of the CL type (Made-to-Order CL or Ready-Made CL). |

Figure 5B:
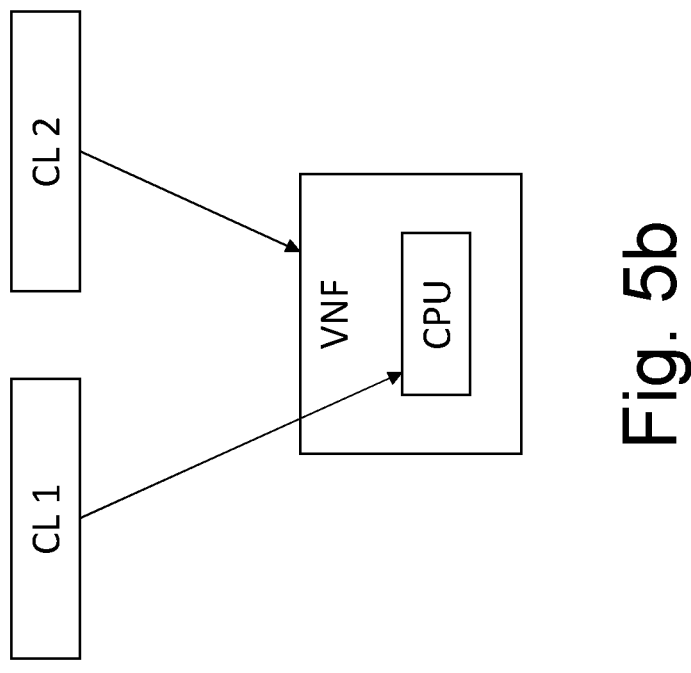
FIGS. 5a and 5b show different closed loop interactions according to some examples.
Figure 5A:
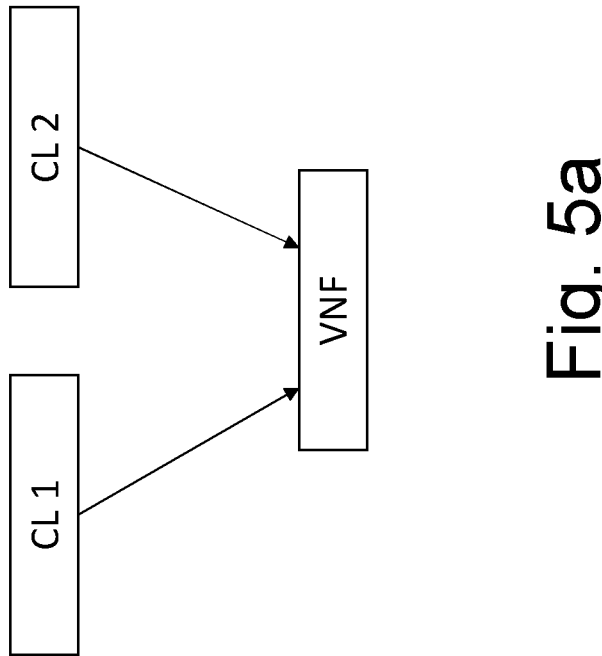

In some examples, two or more instantiated closed loops may act directly on the same managed entity. For example, two CLs may act on the same virtual network function (VNF) instance, as shown in FIG. 5a. Additionally or alternatively, two or more CLs may act indirectly on the same managed entity. For example, one CL may act on the CPU resource of a VNF, while another CL may act on the same VNF instance, as shown in FIG. 5b.

When multiple instantiated CLs act directly or indirectly on the same managed entity, the predicted actions by each CL may be in conflict with each other. That is to say, the CLs may act in the opposite directions of the respective intended goals. As a result, the CLs may act independently, and the result on the managed entity may be undesirable.

Some CL coordination mechanisms may assume that all CLs are independent, and are thus coordinated as independent entities. However, some CLs may belong to a same use case (i.e. they operate on the same managed entity) and have a similar or related goal. If the coordination does not take into account information about whether CLs share similar or related goals, the coordination of the CLs may be inefficient.

It may therefore be beneficial to co-ordinate the operation of different CLs.

Figure 6:
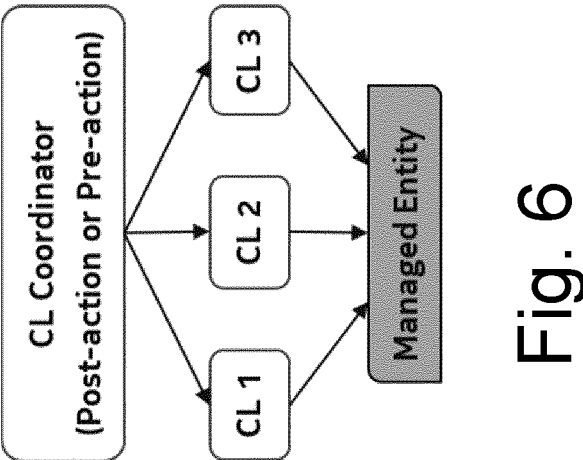
FIG. 6 shows a closed loop coordinator interacting with several closed loop functions according to some examples.

A coordination mechanism, for example a CL coordinator, may be used to detected and mitigate CL conflicts. The coordinator may operate before the conflicts occur (pre-action coordination) or immediately after the conflicts occur (post-action coordination). An example arrangement of such a coordinator is shown in FIG. 6.

In pre-action coordination, the CL coordinator may detect and resolve conflicts between CLs before triggering the execution stage of the CLs. In post-action coordination, the CL coordinator may identify CL actions after the execution stage that lead to undesired or negative outcomes for the managed entity, and determine how to avoid such an outcome in the future.

Some examples provide a mechanism to compose CLs belonging to a similar use case with a similar or related goal as a group of independent hierarchical nested CLs. As such, these CLs may internally coordinate themselves in a hierarchical manner to detect and mitigate conflicts between CL goals.

Reference is made to FIG. 7, which shows a method according to some examples.

At step 700, the method comprises receiving, at a first closed loop function from a second closed loop function, one or more proposed actions to be taken by the second closed loop function with respect to a managed entity, the first and second closed loop functions operating on the managed entity.

At step, 702, the method comprises determining, at the first closed loop function, one or more further actions to be taken, wherein the determining is based on the at least the one or more proposed actions to be taken by the second closed loop function.

At step 704, the method comprises causing, by the first closed loop function, the determined one or more further actions to be taken.

At 706, the method comprises determining, at a second closed loop function, one or more actions to be taken, the one or more actions being associated with a managed entity.

At 708, the method comprises sending, from the second closed loop function to a first closed loop function, the determined one or more actions to be taken by the second closed loop function, the first and second closed loop functions operating on a managed entity.

At 710, the method comprises causing, by the second closed loop function, the determined one or more actions to be taken.

The first CL may receive the one or more proposed actions to be taken by the second closed loop function, and based on the one or more proposed actions, provide at least the one or more proposed actions to a third CL.

Alternatively, the first CL may determine one or more further actions to be taken by the first CL with respect to the managed entity without providing the one or more proposed actions to the third CL.

In a further example, the first CL may determine the one or more further actions to be taken by the first CL with respect to the managed entity and provide both the one or more further actions and the one or more proposed actions to the third CL.

The one or more further actions to be taken with respect to the managed entity may comprise one or more actions to be taken at or for or with regards to the managed entity. For example, the one or more actions may include, but are not limited to, reading the status of the managed entity, or computing new configurations for the managed entity.

The first closed loop function may, for example, be an outermost closed loop function, and the second closed loop function may be an innermost closed loop function. As another example, the first closed loop function may be an intermediate closed loop function and the second closed loop function may be an innermost closed loop function. As a further example, the first closed loop function may be an outermost closed loop function and the second closed loop function may be an intermediate closed loop function.

It should be understood that these examples are non-exhaustive and are provided for illustrative purposes, and other combinations and arrangements are considered as falling within the scope of the method.

In some examples, a plurality of CLs operating on a managed entity having a shared or related goal are configured as a group of interdependent CLs. The CLs may coordinate themselves hierarchically within the group to detect and mitigate conflicting actions. From the perspective of the CL coordinator, the group of CLs may appear as a single entity, i.e. a single CL.

Figure 8A:
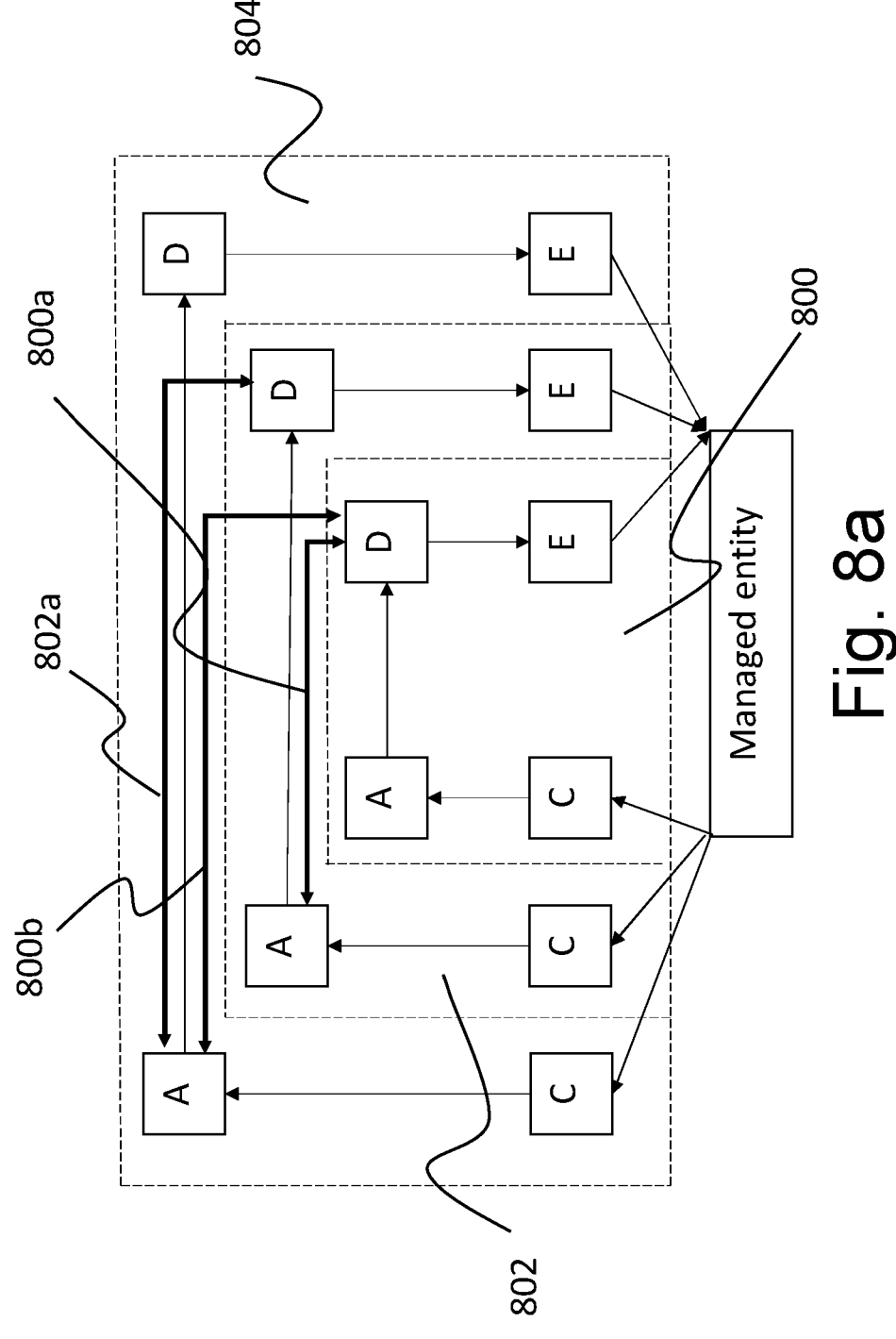
FIGS. 8a and 8b show a nested hierarchy of closed loop functions according to some examples.

To facilitate such a configuration, a grouped/nested CL model/class may be used, such as the one or more of the following attributes:

In the example of FIG. 8a, a first CL 800 is nested within a second CL 802, which is in turn nested within a third CL 804. Each CL is composed of a Collection (C), Analysis (A), Decision (D) and Execution (E) stage as described previously. In the example of FIG. 8, the output (for example, predicted or proposed actions) of the Decision stage of the first CL 800 is input into the Analysis stage of the second CL 802, as indicated by arrow 800a. Similarly, the output of the Decision stage of the second CL 802 is input into the Analysis stage of the third CL 804, as indicated by arrow 802a. In some examples, the output of the Decision stage of the first CL 800 may also be input into the Analysis stage of the third CL 804, as indicated by arrow 800b.

In an alternative arrangement, the Analysis and Decision stages of a CL may be combined into a single Analysis and Decision (A&D) stage.

Figure 8B:
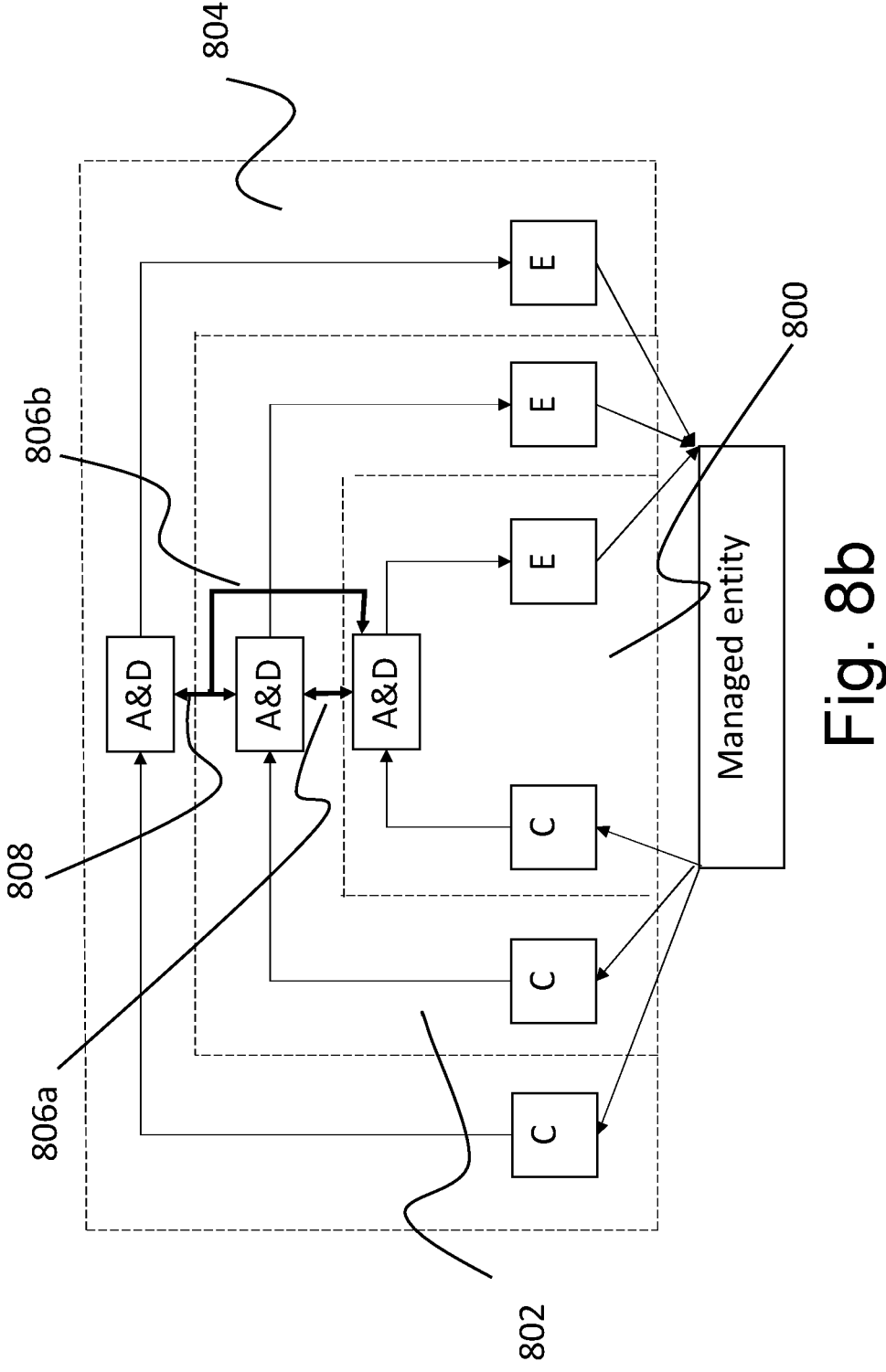

FIG. 8b shows an example of such an arrangement, where insights and workflows from the A&D stage of the first CL 800 are fed into the A&D stage of the second CL 802, as indicated by arrow 806a. An output from the A&D stage of the second CL 802 is then provided as an input to the A&D stage of the third CL 804, as indicated by arrow 808. In some examples, the output of A&D stage of the first CL 800 may also be provided as an input into the A&D stage of the third CL 804, as indicated by arrow 806b.

Thus the output of the decision stage of a lower hierarchy CL may be provided as an input to the analysis stage of at least one higher hierarchy CL. This is shown as step 900a in FIG. 9a.

In some examples, the insights and workflows from a Decision stage of a lower hierarchy CL may be aggregated

TABLE 2

| Attribute Name | Description |
| --- | --- |
| closedLoopGroupInstanceUniqueId | It indicates the identifier of the grouped CL instance. |
| closedLoopGroupGoal | It indicates the common goals of the grouped CL instance. |
| closedLoopGroupPriority | It indicates the priority of the grouped CL instance. It is set to avoid conflicting actions (i.e., between two or more grouped CL instances) to the same managed entity. |
| closedLoopGroupCoordinationType | It indicates the type of hierarchical internal coordination approach (First or Second) within the grouped CL instance to avoid conflicting actions to the same managed entity. |
| closedLoopGroupTypeDescription | It indicates a description of the grouped CL type (Made-to-Order CL or Ready-Made CL). |
| closedLoopClass 1 (Innermost CL) | It is of type closedLoopClass and defines the attributes of the Innermost CL (c.f., Section 2 in this IR). |
| closedLoopClass 2 (Intermediate CL) | It is of type closedLoopClass and defines the attributes of the Intermediate CL (c.f., Section 2 in this IR). (note: there can be 0, 1 or many Intermediate CL instances). |
| . . . | |
| closedLoopClass n (Outermost CL) | It is of type closedLoopClass and defines the attributes of the Outermost CL (c.f., Section 2 in this IR). |

In some examples, the plurality of CLs may be arranged in a hierarchy. The hierarchy may, for example, be defined by the attributes in the above table. The operator or network function instantiating the CLs may decide on the hierarchy and define the attributes accordingly. Insights and workflows from the Decision stage of a first, or lower hierarchy, CL may be fed as an input into the Analytics stage of at least a second, or higher hierarchy, CL(s). This is depicted in FIG. 8, where three CLs are depicted.

before being provided as an input to the Analytics stage of a next (or all) higher hierarchy CL.

In some examples, the Decision stage of a lower hierarchy CL may provide an indication of a problem in the lower hierarchy CL to the next higher hierarchy CL in the arrangement. This may allow the lower hierarchy CL to request the next higher hierarchy CL to takeover control of the lower hierarchy CL and resolve the problem.

Based on the insights & workflows received from the Decision stage of lower hierarchy CLs, the Analytics stage of the higher hierarchy CL may control or configure the Decision stage of the next (or all) lower hierarchy CL(s), as represented by the bidirectional arrows 800a, 800b, 802a in FIG. 8a.

Controlling the Decision stage may, for example, comprise enabling or disabling pause points in the Decision stage. In some examples, the Analysis stage of the higher hierarchy CL may also use the Knowledge component(s) of lower and higher hierarchy CLs in the group.

Alternatively, if Analysis and Decision stages of a CL are combined into a single Analysis & Decision stage, as shown in FIG. 8b, then the Analysis & Decision stage of the higher hierarchy CL may control or configure the Analysis & Decision stage of the next (or all) lower hierarchy CL(s), as indicated by bidirectional arrows 806a, 806b, 808 in FIG. 8b

Thus the analysis stage of the at least one higher hierarchy CL may be used to control or configure the decision stage of at least one lower hierarchy CL based on the output of the decision stage of the at least one lower hierarchy CL. This is shown as step 902a in FIG. 9a.

In some examples, one of the decision stages of the group of CLs may send an output to the corresponding execution stage. This is shown as step 904a in FIG. 9a. The decision stage of the other CLs in the group may be paused while the one of the decision stages is providing the output to the corresponding execution stage.

Figure 10A:
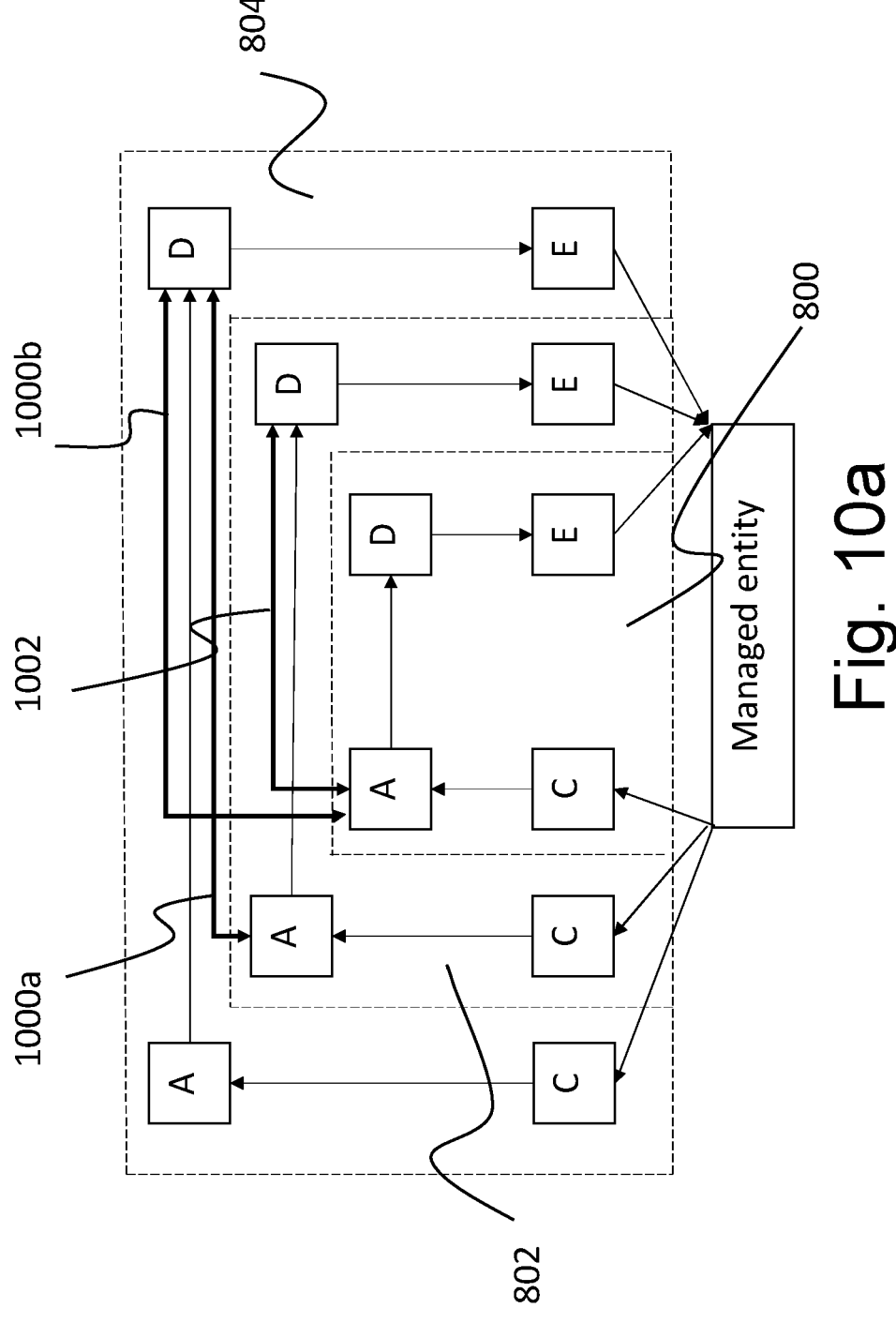
FIGS. 10a and 10b show a nested hierarchy of closed loop functions according to some examples.
Figure 10B:
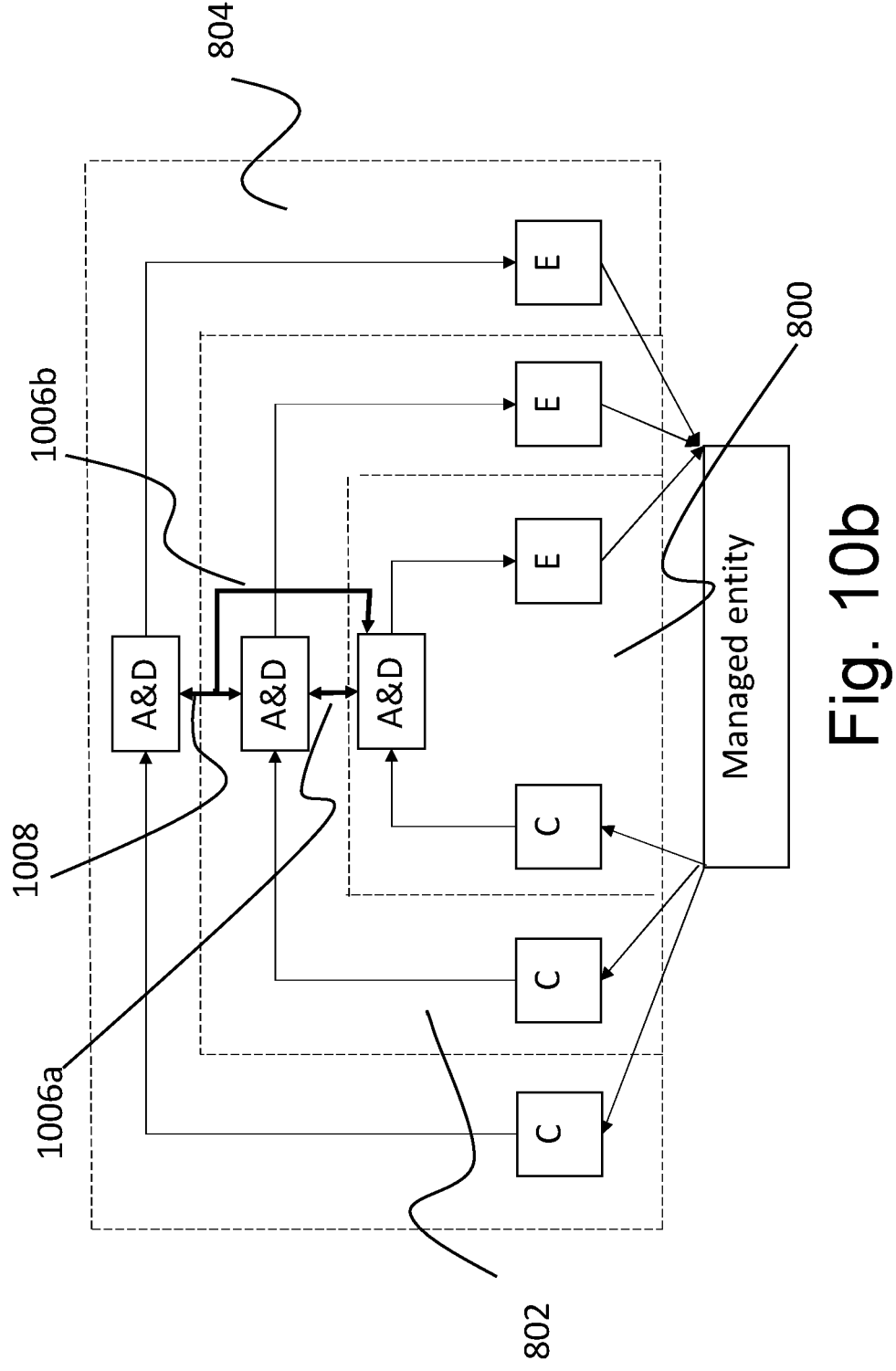

In another example, the insights and workflows from the decision stage of a higher hierarchy CL may be fed as an input into the analysis stage of the next (or all) lower CL(s), as depicted in FIGS. 10a and 10b.

Similarly to FIG. 8, in the example of FIG. 10a, a first CL 800 is nested within a second CL 802, which is in turn nested within a third CL 804, with each CL being composed of a Collection (C), Analysis (A), Decision (D) and Execution (E) stage as described previously.

In the example of FIG. 10a, the output of the Decision stage of the third CL 804 is input into the Analysis stage of the second CL 802, as indicated by arrow 1000a. Similarly, the output of the Decision stage of the second CL 802 is input into the Analysis stage of the first CL 800, as indicated by arrow 1002. In some examples, the output of the Decision stage of the third CL 804 may also be input into the Analysis stage of the first CL 804, as indicated by arrow 1000b.

In an alternative arrangement, the Analysis and Decision stages of a CL may be combined into a single Analysis and Decision (A&D) stage, as with FIG. 8b. FIG. 10b shows an example of such an arrangement, where insights and workflows from the A&D stage of the third CL 800 are fed into the A&D stage of the second CL 802, as indicated by arrow 1006a. An output from the A&D stage of the second CL 802 is then provided as an input to the A&D stage of the third CL 804, as indicated by arrow 1008. In some examples, the output of A&D stage of the first CL 800 may also be provided as an input into the A&D stage of the third CL 804, as indicated by arrow 1006b.

Thus the output of the decision stage of a higher hierarchy CL may be provided as an input to the analysis stage of at least one lower hierarchy CL. This is shown as step 900b in FIG. 9b.

In some examples, the insights and workflows from a Decision stage of a higher hierarchy CL may be aggregated before being provided as an input to the Analytics stage of a next (or all) lower hierarchy CL.

In some examples, the Decision stage of a higher hierarchy CL may provide an indication of a problem in the higher hierarchy CL to the next lower hierarchy CL in the arrangement. This may allow the higher hierarchy CL to request the next lower hierarchy CL to take over control of the higher hierarchy CL and resolve the problem.

Based on the insights & workflows received from the Decision stage of higher hierarchy CLs, the Analytics stage of the lower hierarchy CL may control or configure the Decision stage of the next (or all) higher hierarchy CL(s), as represented by the bidirectional arrows 900a, 900b, 902a in FIG. 10.

Controlling the Decision stage may, for example, comprise enabling or disabling pause points in the Decision stage. In some examples, the Analysis stage of the lower hierarchy CL may also use the Knowledge component(s) of lower and higher hierarchy CLs in the group.

Thus the Analysis stage of the at least one lower hierarchy CL may control or configure the Decision stage of at least one higher hierarchy CL based on the output of the decision stage of the at least one higher hierarchy CL. This is shown as step 902b in FIG. 9b.

In some examples, one of the decision stages of the group of CLs may send an output to the corresponding execution stage. This is shown as step 904b in FIG. 9b. The decision stage of the other CLs in the group may be paused while the one of the decision stages is providing the output to the corresponding execution stage.

Thus the higher (or lower) hierarchy CLs receive, from the lower (or higher) hierarchy CL, the insights and workflows. This may enable the higher (or lower) hierarchy CLs to take into account the proposed actions and desired outcomes of the lower (or higher) hierarchy CL at the managed entity when the higher (or lower) hierarchy CLs derive their own insights and workflows.

An example use case shall now be discussed. It should be understood that the use case is provided to further illustrate the various examples discussed above, and should not be considered limiting.

Autoscaling systems may be used to scale allocated computational resources, such as memory and CPU time. Resource autoscaling can be classified into three types: vertical autoscaling, horizontal autoscaling and node autoscaling.

In vertical autoscaling, the CPU resources may be automatically scaled up/down from an already instantiated Virtual Network Function (VNF) (e.g., Container or Virtual Machine (VM)) based on the workload requirements.

In horizontal autoscaling, new VNFs may be automatically instantiated, or existing VNFs may be automatically released as per the workload requirement.

In node autoscaling, the number of nodes in a given node pool may be automatically resized based on the demands of the workloads.

In some examples, many physical/virtual infrastructure managers include three objects for resource autoscaling, namely, vertical VNF autoscaler, horizontal VNF autoscaler and node autoscaler.

Each of these autoscaler objects may operate using a closed control loop that periodically checks a given workload's metrics against the configured target thresholds and automatically (reactively or proactively) changes the shape of the workload.

Figure 11:
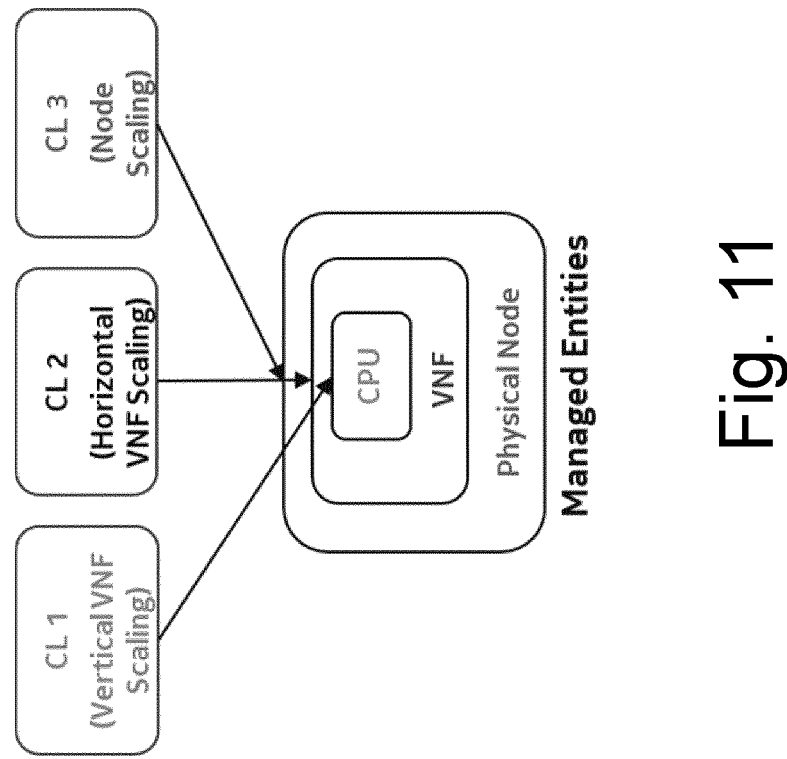
FIG. 11 shows different closed loop functions operating with respect to a managed entity according to some examples.

As shown in FIG. 11, by applying the concepts described previously, an operator may compose and instantiate grouped/nested CLs for resource autoscaling, in which, the Innermost CL is for vertical VNF autoscaling, the Intermediate CL is for horizontal VNF autoscaling and Outermost CL is for node autoscaling.

In some cases, both the vertical VNF autoscaler and the horizontal VNF autoscaler objects may result in possible conflicts in their actions. By implementing the previously discussed examples, such conflicts may be resolved in an efficient manner.

As an example of implementing the method of FIGS. 8a and 9a, the decision stage of the Innermost CL (which in this example is the vertical VNF autoscaling operation, which manages the CPU of the managed entity) may derive insights and workflows (e.g. predicted or proposed actions to apply to the managed entity) based on data collected in the Collection stage of the CL. The decision stage may also utilize data from a Knowledge component. The decision stage may implement machine learning (ML) algorithms (e.g. deep neural networks) to derive the insights and workflows.

The derived insights and workflows may be sent to the analysis stage of the higher hierarchy CLs, which in this case are the Intermediate CL for horizontal VNF autoscaling which controls the VNF, and the Outermost CL for node autoscaling, which controls the node.

The derived insights and workflows may be sent to the analysis stage of the higher hierarchy CLs via an Insight Reporting and Control Interface. The Insight Reporting and Control Interface may support the following capabilities or functions:

The decision stage may implement machine learning (ML) algorithms (e.g. deep neural networks) to derive the insights and workflows.

The derived insights and workflows may be sent to the analysis stage of the higher hierarchy CLs, which in this case are the Intermediate CL for horizontal VNF autoscaling which controls the VNF, and the Innermost CL for vertical VNF autoscaling, which controls the CPU.

The derived insights and workflows may be sent to the analysis stage of the higher hierarchy CLs via the Insight Reporting and Control Interface as described previously.

In some examples, the derived insights and workflows may be sent to the execution stage of the lower hierarchy CL. The execution stage may trigger an action towards the managed entity based on the insights and workflows. In this case, this may mean that the node autoscaling operation performs an action on the physical node.

As a more specific example, again referring to FIG. 11, the decision stage of the vertical VNF autoscaling CL may derive insights & workflows (e.g., add/remove one/more CPU units to the existing VNF at time 't') by applying ML algorithms on the historical CPU data of the VNF collected in the Collection and Knowledge stages of the vertical VNF autoscaling CL.

The derived insights & workflows from vertical VNF autoscaling CL may be sent to the Analytics stage of the

TABLE 3

| Insight Reporting & Control Interface (One CL Decision Stage –> Another CL Analytics Stage) | |
| --- | --- |
| Capabilities | Description |
| Transfer insights & workflows report (raw or aggregate) from one CL to another CL | Transfer a file or stream data on the derived insights & workflows which may include at least some of the following information: Specifies the scope of the target managed entity (e.g., CPU, VNF, node) that the CL is acting on Individual goal of the CL (e.g., maintain sufficient CPU resources in the VNF depending on the traffic load to avoid service degradation) The predicted decision/action (e.g., add/remove one/more CPU units in the VNF) Accuracy/confidence of the prediction (e.g., x% accurate with confidence value y) Timestamp when the predicted action is planned to be executed (e.g., t + 5 minutes) |
| Escalate/signal problem about the CL to another CL | Transfer a file or stream data on the performance of the CL. For e.g., indicating that the required data to train an ML algorithm is not available or indicating that the accuracy/confidence of the prediction is poor or indicating that by performing the predicted action the value of the closedLoopGroupGoal attribute might not be achieved. |

In some examples, the derived insights and workflows may be sent to the execution stage of the lower hierarchy CL. The execution stage may trigger an action towards the managed entity based on the insights and workflows. In the example of FIG. 11, this may mean that the vertical VNF scaling autofunction performs an action on the CPU of the VNF located in the physical node.

It should be understood that the method described in FIGS. 9b and 10b may be applied instead of the method described in FIGS. 8a and 9a.

In the case of the method of FIGS. 9b and 10b, the decision stage of the Outermost CL (which in this example is the node autoscaling operation, which manages the physical node) may derive insights and workflows (such as those listed in the above table 3, for example predicted or proposed actions to apply to the managed entity) based on data collected in the Collection stage of the CL. The decision stage may also utilize data from a Knowledge component.

horizontal VNF autoscaling and node autoscaling CLs. These insights & workflows may be sent either in a file format or as data streams.

The insights & workflows may also be received by the Execution stage (i.e., vertical autoscaler object in the physical/virtual infrastructure manager) of the vertical VNF autoscaling CL, which triggers the proactive vertical VNF autoscaling action towards the CPU of the VNF instance (i.e., managed entity).

The analysis stage of a higher hierarchy CL may consume the insights and workflows from the decision stage of the next or all lower hierarchy CLs. The higher hierarchy CL may use data collected from the collection stage of the higher hierarchy CL, along with the received insights and workflows from the lower hierarchy CL and optionally data from a knowledge component to determine one or more actions to apply to the managed entity.

The higher hierarchy CL may use machine reasoning (MR) or machine learning (ML) algorithms to determine the one or more actions. The MR/ML algorithms may achieve this by creating a semantic data map to understand/learn the context/environment in which the all CLs operate and provides the correct solution based on the semantic graph knowledge using an inference engine.

Figure 12:
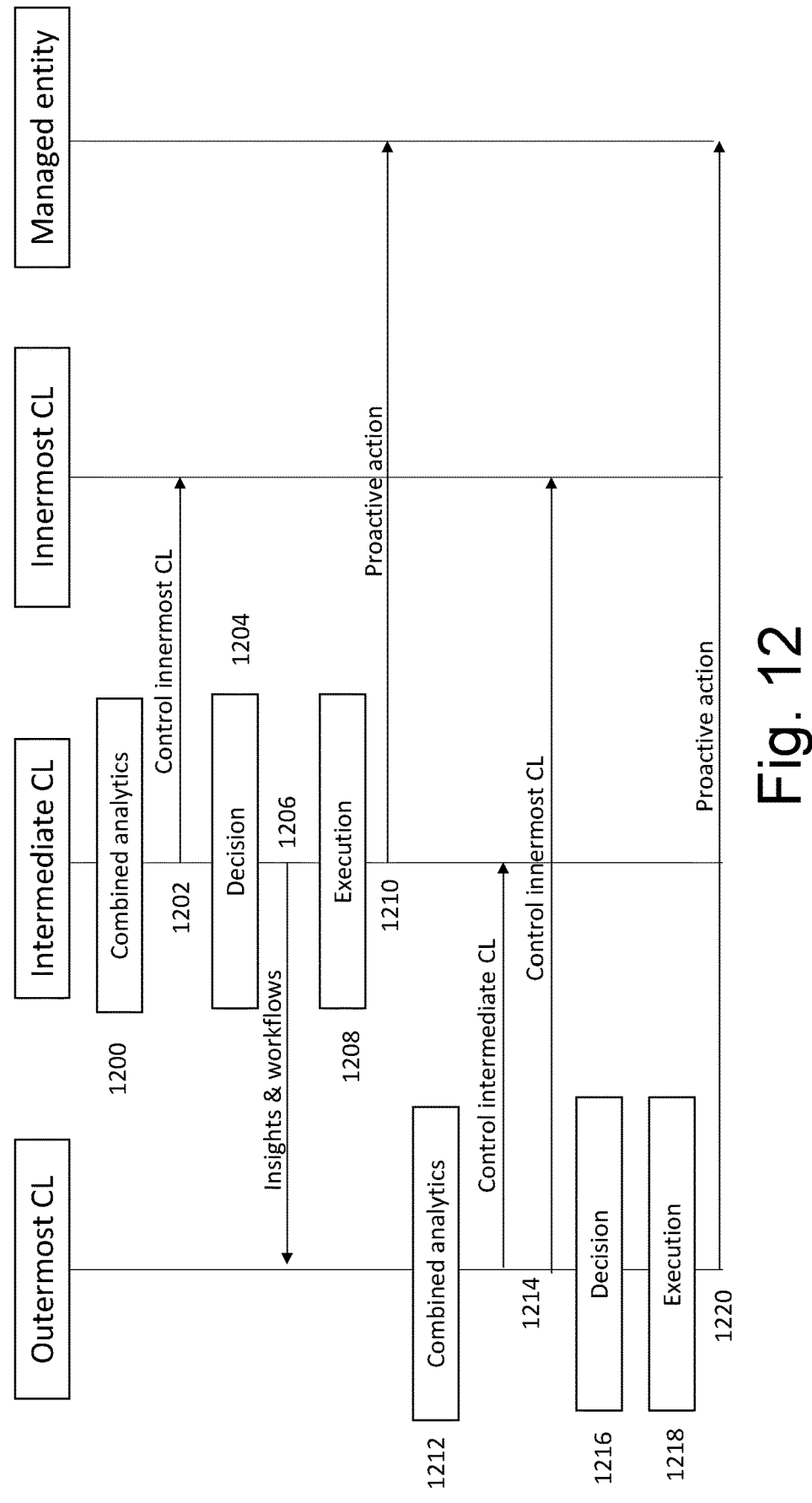
FIG. 12 shows a method according to some examples.

Reference is made to FIG. 12, which shows another example implementation of CL coordination according to the present disclosure.

Referring to the example of FIG. 12, at 1200 the intermediate CL receives analytics from the innermost CL, along with data collected by the intermediate CL and optionally data from a knowledge component, and determines one or more actions.

If the one or more actions includes controlling the innermost CL, for example pausing or unpausing the lower hierarchy CL, then at 1202 a control message is sent to the innermost CL by the analysis stage of the intermediate CL via the Insight Reporting and Control Interface.

The Insight Reporting and Control Interface may support the following capabilities:

outermost CL and optionally the data from the knowledge component. The decision stage may use the MR/ML algorithms discussed previously.

At 1218, the decision stage of the outermost CL passes the insights and workflows to the execution stage of the outermost CL. At 1220 the outermost CL then takes one or more actions towards the managed entity based on the insights and workflows.

Referring back to the scenario of FIG. 11, and with reference to the method shown in FIG. 12, then at 1200 the analysis stage of the horizontal VNF autoscaling CL may consume the insights & workflows from the Decision stage of the vertical VNF autoscaling CL.

Together with the consumed insights & workflows from the Decision stage of the vertical VNF autoscaling CL, historical VNF (e.g., CPU, memory, networking) data collected from the Collection stage and Knowledge component of the vertical VNF autoscaling CL, and the Knowledge stages of vertical VNF autoscaling and horizontal VNF autoscaling CLs, Machine Reasoning (MR) algorithms can be applied to determine the best course of action, such as when/why to pause/unpause the vertical VNF autoscaling

TABLE 4

| Insight Reporting & Control Interface (One CL Analytics Stage –> Another CL Decision Stage) | |
| --- | --- |
| Capabilities | Description |
| Pause/unpause another CL(s) | Set pause point on the Decision stage of another CL(s) by indicating how long the CL is in pause state. Alternatively, the CL may be unpaused only when the action/trigger is requested by other CL(s) in the closedLoopGroup instance. |
| Update/reconfigure individual goal of another CL | Updates/reconfigures the value of the closedLoopGoal attribute of another CL instance. |
| Configure insight & workflow report requirements to be received from another CL | Configure whether raw reports are needed or aggregated reports (also specifying the time granularity) is sufficient for Machine Reasoning analysis. |

At 1204, the decision stage of the intermediate CL derives insights and workflows based on the analytics from the innermost CL, along with the data collected by the intermediate CL and optionally the data from the knowledge component. The decision stage may use the MR/ML algorithms discussed previously.

At 1206, the decision stage of the intermediate CL sends the insights and workflows to the analysis stage of the outermost CL.

At 1208, the decision stage of the intermediate CL passes the insights and workflows to the execution stage of the intermediate CL. At 1210, the intermediate CL then takes one or more actions towards the managed entity based on the insights and workflows.

At 1212, the outermost CL receives the insights and workflows from the decision stage of the intermediate CL, and then determines one or more actions. While not shown explicitly in the Figure, in some examples the outermost CL may receive the insights and workflows of the innermost CL from the intermediate CL, or directly from the innermost CL.

If the one or more actions includes controlling the intermediate CL and/or the innermost CL, then at 1214 a control message is sent to the intermediate CL and/or the innermost CL by the analysis stage of the outermost CL via the Insight Reporting and Control Interface discussed previously.

At 1216, the decision stage of the outermost CL derives insights and workflows based on the analytics from the intermediate CL, along with the data collected by the CL and what to reconfigure (e.g., scaling threshold levels) to improve the performance of vertical VNF autoscaling CL.

At 1202, if the determined best course of action in previous step is to pause the vertical VNF autoscaling CL, then the pause control message is sent to the Decision stage of the vertical VNF autoscaling CL by the Analytics stage of the horizontal VNF autoscaling CL.

At 1204, the Decision stage of the horizontal VNF autoscaling CL may derive insights & workflows (e.g., add/remove one/more VNF instances at time 't') by applying ML algorithms on the data collected in the Collection and Knowledge stage of the horizontal VNF autoscaling CL.

At 1206, the analysis stage of the node autoscaling CL may consume the insights & workflows from the Decision stage of the horizontal VNF autoscaling CL, along with the consumed insights & workflows from the Decision stage of the vertical VNF autoscaling CL.

At 1208, the insights & workflows are also received by the Execution stage (i.e., horizontal autoscaler object in the physical/virtual infrastructure manager) of the horizontal VNF autoscaling CL, which at 1210 triggers the proactive horizontal VNF autoscaling action towards the VNF instance (i.e., managed entity).

At 1212, the Analysis stage of the node autoscaling CL consumes the insights & workflows from the Decision stages of the vertical VNF autoscaling and horizontal VNF autoscaling CLs.

Together with the consumed insights & workflows from the Decision stages of the vertical VNF autoscaling and horizontal VNF autoscaling CLs, historical VNF data of all the VNFs in the node collected from the Collection stage and Knowledge component of the node autoscaling CL, and the Knowledge component of vertical VNF autoscaling, horizontal VNF autoscaling and node autoscaling CLs, Machine Reasoning (MR) algorithms can be applied to determine the best course of action, such as when/why to pause/unpause the vertical VNF autoscaling and/or horizontal VNF autoscaling CL and what to reconfigure (e.g., scaling threshold levels) to improve the performance of vertical and/or horizontal VNF autoscaling CL.

At 1214, if the determined best course of action in previous step is to pause the vertical VNF autoscaling and/or horizontal VNF autoscaling CL, then the pause control message is sent to the Decision stage of the vertical VNF autoscaling and/or horizontal VNF autoscaling CL by the Analytics stage of the node autoscaling CL.

At 1216, the Decision stage of the node autoscaling CL may derive insights & workflows (e.g., add/remove one/more nodes from the cluster at time 't') by applying ML algorithms on the data collected in the Collection and Knowledge stages of the node autoscaling CL.

At 1218, the insights & workflows are also received by the Execution stage (i.e., node autoscaler object in the physical/virtual infrastructure manager) of the node autoscaling CL, which at 1220 triggers the proactive node autoscaling action towards the node (managed entity).

It is noted that while the above describes examples, there are several variations and modifications which may be made to the disclosed solution without departing from the scope of the present invention.

In some examples, an apparatus may comprise means for receiving, at a first closed loop function from a second closed loop function, one or more proposed actions to be taken by the second closed loop function with respect to a managed entity, the first and second closed loop functions operating on the managed entity; determining, at the first closed loop function, one or more further actions to be taken, wherein the determining is based on the at least the one or more proposed actions to be taken by the second closed loop function; and causing, by the first closed loop function, the determined one or more further actions to be taken.

In some examples, an apparatus may comprise means for: determining, at a second closed loop function, one or more actions to be taken, the one or more actions being associated with a managed entity; sending, from the second closed loop function to a first closed loop function, the determined one or more actions to be taken by the second closed loop function, the first and second closed loop functions operating on a managed entity; and causing, by the second closed loop function, the determined one or more actions to be taken.

In some examples, an apparatus may comprise at least one processor and at least one memory including computer code for one or more programs, the at least one memory and the computer code configured, with the at least one processor, to cause the apparatus at least to: receive, at a first closed loop function from a second closed loop function, one or more proposed actions to be taken by the second closed loop function with respect to a managed entity, the first and second closed loop functions operating on the managed entity; determine, at the first closed loop function, one or more further actions to be taken, wherein the determining is based on the at least the one or more proposed actions to be taken by the second closed loop function; and cause, by the first closed loop function, the determined one or more further actions to be taken.

In some examples, an apparatus may comprise at least one processor and at least one memory including computer code for one or more programs, the at least one memory and the computer code configured, with the at least one processor, to cause the apparatus at least to: determine, at a second closed loop function, one or more actions to be taken, the one or more actions being associated with a managed entity; send, from the second closed loop function to a first closed loop function, the determined one or more actions to be taken by the second closed loop function, the first and second closed loop functions operating on a managed entity; and cause, by the second closed loop function, the determined one or more actions to be taken. It will be understood that although the above concepts have been discussed in the context of a 5GS, one or more of these concepts may be applied to other cellular systems.

It will also be understood that although the above mechanism has been described as being implemented by a messaging framework, the mechanism may be implemented by another apparatus, entity or function.

The examples may thus vary within the scope of the attached claims. In general, some examples may be implemented in hardware or special purpose circuits, software, logic or any combination thereof. For example, some aspects may be implemented in hardware, while other aspects may be implemented in firmware or software which may be executed by a controller, microprocessor or other computing device, although examples are not limited thereto. While various examples may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures may represent program procedures, or interconnected logic circuits, blocks and functions, or a combination of program procedures and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or methods/procedures previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus for coordinating resource autoscaling in a virtualized network infrastructure, the apparatus comprising:

a processor; and a memory storing computer-executable instructions that, when executed by the processor, cause the apparatus to operate as an intermediate closed loop (CL) function in a grouped hierarchical closed loop instance having a predefined closedLoopGroupInstanceUniqueId, the grouped hierarchical closed loop instance comprising:

an innermost closed loop configured for vertical virtual network function (VNF) autoscaling of central processing unit (CPU) resources of a VNF, the intermediate closed loop configured exclusively for horizontal VNF autoscaling of the same VNF, and an outermost closed loop configured exclusively for node autoscaling of a physical node hosting the VNF, wherein the intermediate closed loop and the innermost closed loop operate on the same managed entity comprising the VNF and its CPU resources; and wherein the instructions further cause the apparatus to perform the following operations:

receiving, via an Insight Reporting and Control Interface, from a Decision stage of the innermost closed loop, a structured insight report comprising:

(i) an identifier of the managed entity including the VNF instance identifier and CPU scope,

(ii) a predicted vertical scaling action comprising adding or removing a specified number of CPU units, (iii) an associated execution timestamp, and (iv) an accuracy or confidence value of the predicted vertical scaling action;

applying a machine reasoning or machine learning algorithm using:

(i) the received structured insight report, (ii) historical VNF performance data collected in a Collection stage of the intermediate closed loop, and (iii) configuration data stored in a Knowledge component shared within the grouped hierarchical closed loop instance, based on the received predicted vertical scaling action and the applied machine reasoning or machine learning algorithm, determining the following:

(i) a horizontal scaling action comprising instantiating or releasing one or more VNF instances, and (ii) a control action directed to the innermost closed loop comprising pausing or unpausing a Decision stage of the innermost closed loop;

transmitting, via the Insight Reporting and Control Interface, a control message to the innermost closed loop that sets or releases a pause point in the Decision stage of the innermost closed loop when the determined control action includes pausing or unpausing; and causing execution of the determined horizontal scaling action toward the managed entity via an Execution stage of the intermediate closed loop, wherein, during execution of the determined horizontal scaling action, the Decision stage of the innermost closed loop remains paused to prevent conflicting autoscaling actions within the grouped hierarchical closed loop instance.

2. The apparatus of claim 1, wherein the structured insight report is received as a streaming data feed including periodic updates at a predefined time granularity of less than five minutes.

3. The apparatus of claim 1, wherein the horizontal scaling action comprises instantiating an additional VNF instance on the same physical node hosting the VNF prior to execution of the predicted vertical scaling action.

4. The apparatus of claim 1, wherein the Insight Reporting and Control Interface is further configured to update a closedLoopGoal attribute of the innermost closed loop to modify CPU scaling threshold levels before unpausing the Decision stage.

5. The apparatus of claim 4, wherein the machine reasoning or machine learning algorithm comprises a deep neural network trained using historical CPU utilization time-series data of the VNF stored in the Knowledge component.

6. The apparatus of claim 5, wherein the control message sets the pause point in the Decision stage of the innermost closed loop for a predefined pause duration corresponding to the execution timestamp of the horizontal scaling action.

7. The apparatus of claim 6, wherein the machine reasoning or machine learning algorithm further evaluates the accuracy or confidence value of the predicted vertical scaling action against a predefined confidence threshold and determines the control action when the confidence value is below the predefined confidence threshold.

8. The apparatus of claim 7, wherein the Knowledge component shared within the grouped hierarchical closed loop instance stores scaling threshold parameters for CPU utilization, memory usage, and network throughput associated with the VNF.

9. The apparatus of claim 8, wherein the intermediate closed loop aggregates multiple structured insight reports from the innermost closed loop over a sliding time window prior to applying the machine reasoning or machine learning algorithm.

10. The apparatus of claim 9, wherein the grouped hierarchical closed loop instance is configured such that only one Decision stage among the innermost, intermediate, and outermost closed loops is permitted to execute at a time, and the remaining Decision stages are paused during execution of the horizontal scaling action.

11. A method for coordinating resource autoscaling in a virtualized network infrastructure by an apparatus configured to operate as an intermediate closed loop (CL) function in a grouped hierarchical closed loop instance having a predefined closedLoopGroupInstanceUniqueId, the grouped hierarchical closed loop instance comprising:

an innermost closed loop configured for vertical virtual network function (VNF) autoscaling of central processing unit (CPU) resources of a VNF, the intermediate closed loop configured exclusively for horizontal VNF autoscaling of the same VNF, and an outermost closed loop configured exclusively for node autoscaling of a physical node hosting the VNF, wherein the intermediate closed loop and the innermost closed loop operate on the same managed entity comprising the VNF and its CPU resources, the method comprising:

receiving, via an Insight Reporting and Control Interface, from a Decision stage of the innermost closed loop, a structured insight report comprising:

(i) an identifier of the managed entity including the VNF instance identifier and CPU scope, (ii) a predicted vertical scaling action comprising adding or removing a specified number of CPU units, (iii) an associated execution timestamp, and (iv) an accuracy or confidence value of the predicted vertical scaling action;

applying a machine reasoning or machine learning algorithm using:

(i) the received structured insight report, (ii) historical VNF performance data collected in a Collection stage of the intermediate closed loop, and (iii) configuration data stored in a Knowledge component shared within the grouped hierarchical closed loop instance, based on the received predicted vertical scaling action and the applied machine reasoning or machine learning algorithm, determining the following:

(i) a horizontal scaling action comprising instantiating or releasing one or more VNF instances, and (ii) a control action directed to the innermost closed loop comprising pausing or unpausing a Decision stage of the innermost closed loop;

transmitting, via the Insight Reporting and Control Interface, a control message to the innermost closed loop that sets or releases a pause point in the Decision stage of the innermost closed loop when the determined control action includes pausing or unpausing; and causing execution of the determined horizontal scaling action toward the managed entity via an Execution stage of the intermediate closed loop, wherein, during execution of the determined horizontal scaling action, the Decision stage of the innermost closed loop remains paused to prevent conflicting autoscaling actions within the grouped hierarchical closed loop instance.

12. The method of claim 11, wherein the structured insight report is received as a streaming data feed including periodic updates at a predefined time granularity of less than five minutes.

13. The method of claim 11, wherein the horizontal scaling action comprises instantiating an additional VNF instance on the same physical node hosting the VNF prior to execution of the predicted vertical scaling action.

14. The method of claim 11, wherein the Insight Reporting and Control Interface is further configured to update a closedLoopGoal attribute of the innermost closed loop to modify CPU scaling threshold levels before unpausing the Decision stage.

15. The method of claim 14, wherein the machine reasoning or machine learning algorithm comprises a deep neural network trained using historical CPU utilization time-series data of the VNF stored in the Knowledge component.

16. The method of claim 15, wherein the control message sets the pause point in the Decision stage of the innermost closed loop for a predefined pause duration corresponding to the execution timestamp of the horizontal scaling action.

17. The method of claim 16, wherein the machine reasoning or machine learning algorithm further evaluates the accuracy or confidence value of the predicted vertical scaling action against a predefined confidence threshold and determines the control action when the confidence value is below the predefined confidence threshold.

18. The method of claim 17, wherein the Knowledge component shared within the grouped hierarchical closed loop instance stores scaling threshold parameters for CPU utilization, memory usage, and network throughput associated with the VNF.

19. The method of claim 18, wherein the intermediate closed loop aggregates multiple structured insight reports from the innermost closed loop over a sliding time window prior to applying the machine reasoning or machine learning algorithm.

20. The method of claim 19, wherein the grouped hierarchical closed loop instance is configured such that only one Decision stage among the innermost, intermediate, and outermost closed loops is permitted to execute at a time, and the remaining Decision stages are paused during execution of the horizontal scaling action.

* * * * *